(12) United States Patent
Michl

(10) Patent No.: US 8,348,230 B2
(45) Date of Patent: Jan. 8, 2013

(54) SOLENOID VALVE

(75) Inventor: Thomas Michl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 12/672,071

(22) PCT Filed: Jul. 7, 2008

(86) PCT No.: PCT/EP2008/058745
§ 371 (c)(1),
(2), (4) Date: Feb. 4, 2010

(87) PCT Pub. No.: WO2009/019094
PCT Pub. Date: Feb. 12, 2009

(65) Prior Publication Data
US 2011/0186760 A1  Aug. 4, 2011

(30) Foreign Application Priority Data
Aug. 7, 2007 (DE) .......................... 10 2007 037 220

(51) Int. Cl.
*F16K 31/02* (2006.01)
(52) U.S. Cl. .................................. 251/129.07; 251/175
(58) Field of Classification Search ............ 251/129.07, 251/129.08, 129.15, 175, 332
See application file for complete search history.

(56) References Cited

U.S. PATENT DOCUMENTS

| | | | | |
|---|---|---|---|---|
| 3,034,761 A | * | 5/1962 | Janquart | 251/210 |
| 4,540,154 A | * | 9/1985 | Kolchinsky et al. | 251/129.15 |
| 5,918,635 A | * | 7/1999 | Wang et al. | 137/625.65 |
| 6,607,175 B1 | * | 8/2003 | Nguyen et al. | 251/63.5 |
| 7,275,732 B2 | * | 10/2007 | Kato et al. | 251/129.15 |
| 7,341,320 B2 | * | 3/2008 | Otsuka et al. | 303/119.2 |
| 2004/0089832 A1 | * | 5/2004 | Wilde et al. | 251/129.15 |
| 2006/0180783 A1 | * | 8/2006 | Tackes et al. | 251/129.15 |
| 2008/0163837 A1 | * | 7/2008 | Daut | 123/90.17 |
| 2010/0059698 A1 | * | 3/2010 | Guggenmos et al. | 251/129.15 |

FOREIGN PATENT DOCUMENTS

| | | |
|---|---|---|
| DE | 3700540 A1 | 7/1988 |
| DE | 4031885 A1 | 4/1992 |
| DE | 10200915 A1 | 10/2002 |
| GB | 2332261 A | 6/1999 |
| WO | 2007064823 A1 | 6/2007 |

* cited by examiner

*Primary Examiner* — Eric Keasel
*Assistant Examiner* — Reinaldo Sanchez-Medina
(74) *Attorney, Agent, or Firm* — Maginot, Moore & Beck

(57) ABSTRACT

The invention relates to a solenoid valve having a valve cartridge, which includes a pole core, a valve insert connected to the pole core, an armature that is axially movably guided inside the valve insert and is coupled to a main closing element, and a valve body connected to the valve insert. The valve body forms a main valve with the main closing element and is disposed between at least one first flow opening and a second flow opening. The axial motion of the armature and of the main closing element opens the main valve against the force of a restoring spring, and the force of the restoring spring closes the main valve. According to the invention, the main closing element is designed as a sliding element axially movably guided inside an inner bore of the valve body. The sliding element and the armature are connected to each other and are pressure-compensated by a compensating port. The sliding element is moveable into an open position by a linear axial opening motion of the armature, and is moveable into a closed position by the restoring spring via the at mature by a linear motion.

19 Claims, 4 Drawing Sheets

SOLENOID VALVE

CROSS-REFERENCE TO RELATED APPLICATION

This application is a 35 USC 371 application of PCT/EP2008/058745 filed on Jul. 7, 2008.

BACKGROUND OF THE INVENTION

1. Field of the Invention

The invention relates to a solenoid valve.

2. Description of the Prior Art

A conventional solenoid valve, particularly for a hydraulic assembly, which is used for instance in an anti-lock brake system (ABS) or a traction control system (TC system) or an electronic stability program (ESP system), is shown in FIG. 1. As seen in FIG. 1, the conventional solenoid valve, which is embodied for instance as a two-stage on-off valve that is closed when without current, includes a valve cartridge 1, which includes a pole core 2, a valve insert 4 connected to the pole core 2, an armature 3 guided axially movably inside the valve insert 4 and coupled with a primary closing element 7, and a valve body 8 connected to the valve insert 4, which body, with the primary closing element 7 and a primary valve seat 9, forms a primary valve disposed between at least one first flow opening 12 and a second flow opening 13, and via the axial motion of the armature 3 and of the primary closing element 7, the primary valve seat 9 is opened counter to the force of a restoring spring 5 and closed by the force of the restoring spring 5, and an air gap 6 between the armature 3 and the pole core 2 predetermines a maximum possible stroke of the armature 3. The valve body 8 and the valve insert 4 are each embodied as a sleeve and are connected to one another.

Because of the two-stage embodiment, a secondary valve, which is formed by a secondary closing element 11 that is connected to the armature 3 and by a secondary valve seat 10 that is disposed in the primary closing element 7, has a smaller sealing diameter and flow, so that an opening of the secondary valve counter to a high pressure, which results in a partly active or preloaded pressure buildup, is made possible. The primary valve with the primary valve seat 9, which has a large seat cross section, and the primary closing element 7 make a large flow possible which is as unthrottled as possible and which results in a fully active or self-aspirating pressure buildup. A magnet assembly, not shown, by supplying current to a coil winding, generates a magnetic force which moves the longitudinally movable armature 3 with the secondary closing element 11 counter to the force of a restoring spring 5 against the pole core 2, as a result of which the secondary valve seat 10 is opened. By means of the pressure equilibrium effected upon the opening of the secondary valve seat 10 between the at least one first flow opening 12 and the second flow opening 13, a compression spring 14 reinforced by fluid flow forces moves the primary closing element 7 in the direction of the armature 3 or the secondary closing element 11, as a result of which the primary valve seat 9 suddenly opens and the secondary valve seat 11 closes again. In this conventional solenoid valve, the annoying hydraulic noises that occur upon opening of the primary valve in the preloaded mode, which are also known as fluid-borne sound, can be considered disadvantageous.

ADVANTAGES AND SUMMARY OF THE INVENTION

The solenoid valve according to the invention has the advantage over the prior art that a primary closing element is embodied as a slide element, guided axially movably inside an inner bore of the valve body, and the slide element and an armature are connected to one another and are embodied as pressure-equalized by a compensation bore, and the slide element is movable into an opening position by means of a linear axial opening motion of the armature and is movable into a closing position by means of a linear motion by the restoring spring via the armature. The linear axial opening motion of the armature can be effected by a magnetic force generated by means of supplying current to a magnet assembly. By means of the solenoid valve of the invention, a volumetric flow over time can be adjusted such that as a result, during the opening operation, there is advantageously no fluid-borne sound or hydraulically induced switching noise with a pressure wave, and so the armature with the slide element is not suddenly moved in the direction of the pole core at an only slight or absent pilot pressure, but instead is moved by means of a linear motion into the opening position. Since the slide element is likewise moved by means of a linear motion into the closing position by the force of the restoring spring, annoying hydraulically-induced noises do not occur in the closing motion, either. In the opening position of the slide element, a primary valve disposed between at least one first flow opening and a second flow opening is fully open, so that a high flow rate ensues.

It is especially advantageous that the slide element is embodied as a plastic part, with at least one sealing lip which seals off the primary valve from the inner bore of the valve body. The at least one sealing lip can for instance be integrally injection-molded onto the plastic slide element and/or can be calibrated upon assembly with the slide element. The slide element can for instance be embodied in two pieces, and an upper slide element has a first sealing lip and a lower slide element has a second sealing lip. The sealing lips are preferably disposed such that via a pilot pressure, applied to the at least one first flow opening, results in automatic sealing between the sealing lips and the inner bore of the valve body. Moreover, the upper slide element can be connected positively and/or nonpositively to the lower slide element. The at least one sealing lip contacting the inner bore of the valve body advantageously reinforces the linear motion of the slide element. Moreover, only slight leakage results, since the sealing action of the at least one sealing lip, with increasing pilot pressure, likewise increases.

In a feature of the solenoid valve of the invention, the valve insert and the valve body are each embodied as a sleeve, and the valve insert sleeve and the valve body sleeve can be embodied in one piece and/or in two pieces.

In a further feature of the solenoid valve of the invention, the at least one first flow opening is embodied such that the noise caused by a volumetric flow over time between the at least one first flow opening and the second flow opening is reduced. The at least one first flow opening is embodied for example such that between the at least one first flow opening and the second flow opening, a progressive volumetric flow over time results during the opening phase of the primary valve, and a degressive volumetric flow over time results during the transition to the full opening of the primary valve. This is attained for instance by means of a round, quadrilateral or triangular shape of the at least one first flow opening. Moreover, the at least one first flow opening is embodied such that a gradient of the volumetric flow over time between the at least one first flow opening and the second flow opening does not exceed a predetermined threshold value of 300 bar/s, for instance.

In a further feature of the solenoid valve of the invention, the pressure-equalized armature can be embodied as a flat armature or as a solenoid plunger. The flat armature cooperates with a pole core that has a flat pole face, and the solenoid plunger, with a correspondingly embodied pole core, forms a plunger stage. The aforementioned gradient of the volumetric flow over time can also be varied by means of the triggering current of the magnet assembly and by the embodiment of the armature and the pole core.

BRIEF DESCRIPTION OF THE DRAWINGS

The invention is described in further detail below in conjunction with the drawings.

DESCRIPTION OF THE PREFERRED EMBODIMENTS

Figure 2:
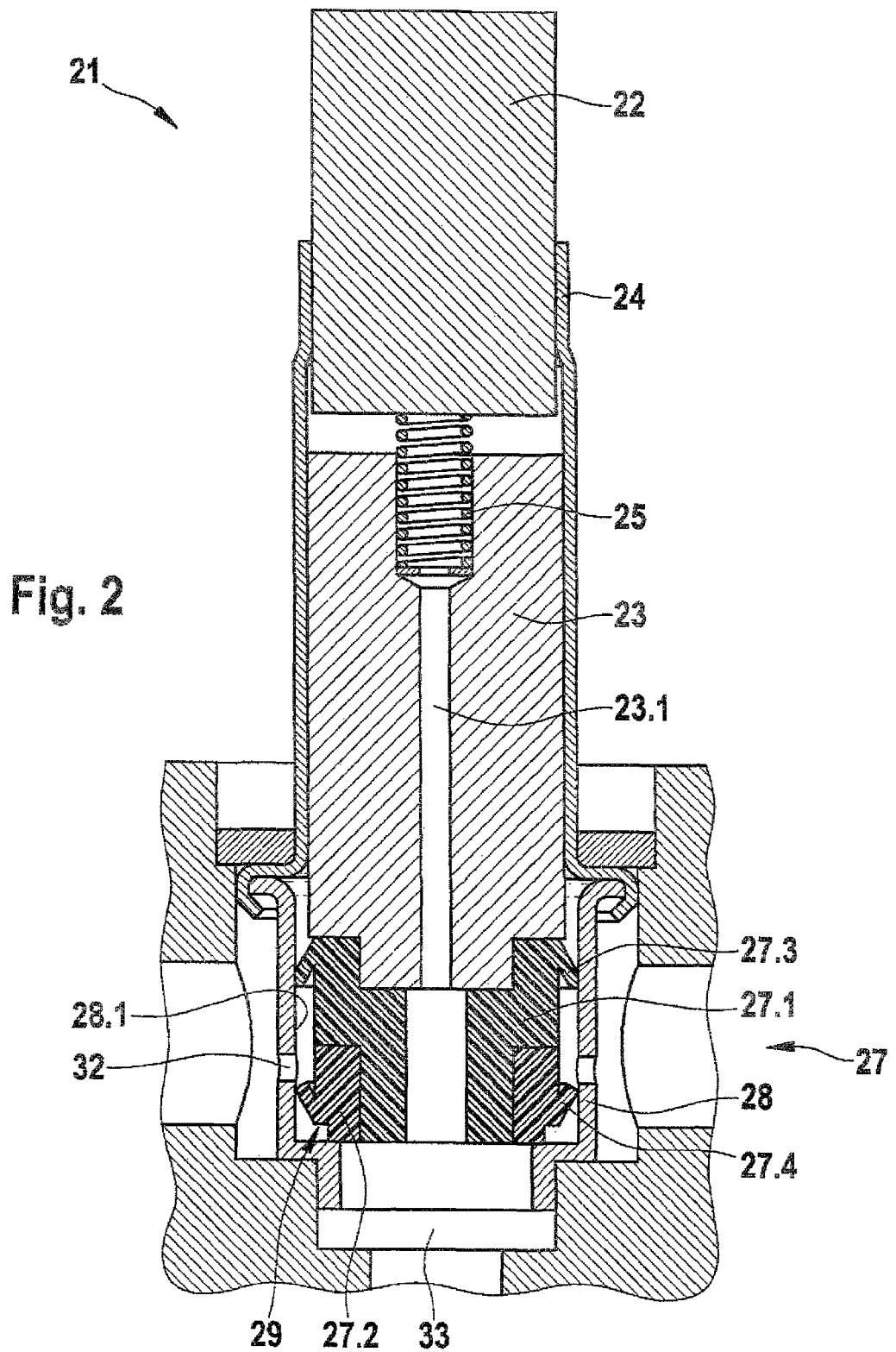
FIG. 2 shows a schematic sectional view of a first exemplary embodiment of a valve cartridge for a solenoid valve according to the invention.

As can be seen from FIG. 2, a first exemplary embodiment of a valve cartridge 21 for a solenoid valve of the invention includes a pole core 22, the valve insert 24 connected to the pole core 22, an armature 23, which is guided axially movably inside the valve insert 24 and is connected to a primary closing element labeled as reference number 27, and a valve body 28, which is connected to the valve insert 24 and which with the primary closing element forms a primary valve 29 disposed between a plurality of first flow openings 32 and a second flow opening 33. The primary closing element is embodied as a two-piece plastic slide element 27, guided axially movably inside an inner bore 28.1 of the valve body 28, which includes an upper slide element 27.1 that has a first sealing lip 27.3 and a lower slide element 27.2 that has a second sealing lip 27.4. The sealing lips 27.3, 27.4 are disposed such that by way of a pilot pressure applied to the first flow openings 32, an automatic sealing takes place between the sealing lips 27.3, 27.4 and the inner bore 28.1 of the valve body 28. The upper slide element 27.1 is for instance pressure-injected or latched to the lower slide element 27.2 or in some other way connected positively and/or nonpositively to the lower slide element 27.2. In the exemplary embodiment shown, the sealing lips 27.3, 27.4 are integrally injection-molded onto the plastic slide element 27. In an alternative embodiment, not shown, the sealing lips are connected to the slide element and calibrated upon assembly with the slide element. Furthermore, the valve insert 24 and the valve body 28 are each embodied as a sleeve and are connected to one another. In an alternative embodiment, not shown, the valve insert sleeve and the valve body sleeve may be embodied in one piece.

As also seen from FIG. 2, the slide element 27 and the armature 23 are embodied as pressure-equalized by means of a compensation bore. For opening the primary valve 29, a magnet assembly, not shown, is supplied with current, as a result of which a magnetic force generated moves the armature 23 with the slide element 27, counter to the force of a restoring spring 25, into an opening position by means of a linear opening motion axially in the direction of the pole core 22. By means of the restoring spring 25, the slide element 27 is moved, via the armature 23, into the closing position by a linear motion when the current supply to the magnet assembly, not shown, is ended. By means of the linear motion of the slide element 27, the annoying hydraulic noises that occur in the conventional solenoid valves are avoided. Moreover, the sealing lips, contacting the inner bore 28.1 of the valve body 28, advantageously reinforce the linear motions of the slide element 27. Since the sealing action of the sealing lips 27.3, 27.4, with increasing pilot pressure, likewise increases, the result is moreover only slight leakage.

In addition, the noise of volumetric flow over time can be reduced by means of a suitable design of the first flow openings 32. For instance, the first flow openings 32 can be embodied such that between the first flow openings 32 and the second flow opening 33, a progressive volumetric flow over time results during the opening phase of the primary valve 29, and a degressive volumetric flow over time results during the transition to full opening of the primary valve 29. The first flow openings 32, depending on the use of the solenoid valve, can for instance be embodied such that a gradient of the volumetric flow over time between the first flow openings 32 and the second flow opening 33 does not exceed a predetermined threshold value, for instance of 300 bar/s.

Figure 4A:
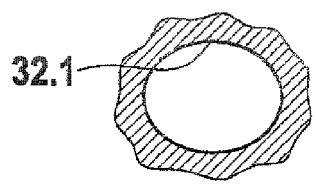
FIGS. 4a and 4b show respectively a round cross-sectional shapes of a first flow opening of the valve cartridge of the invention of FIG. 2 or FIG. 3, and an associated graph of a volumetric flow over time.
Figure 4B:
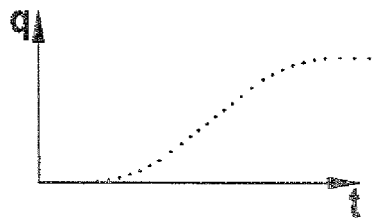
Figure 5A:
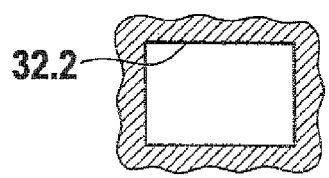
FIGS. 5a and 5b show respectively a quadrilateral cross-sectional shape of the first flow opening of the valve cartridge of the invention of FIG. 2 or FIG. 3, and an associated graph of the volumetric flow over time.
Figure 5B:
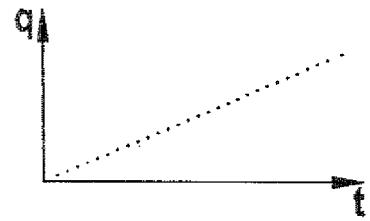
Figure 6A:
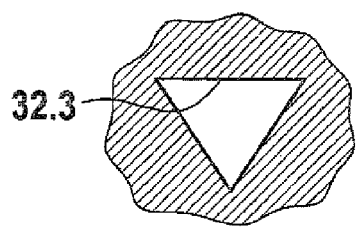
FIGS. 6a and 6b show respectively a triangular cross-sectional shape of the first flow opening of the valve cartridge of the invention of FIG. 2 or FIG. 3, and an associated graph of the volumetric flow over time.
Figure 6B:
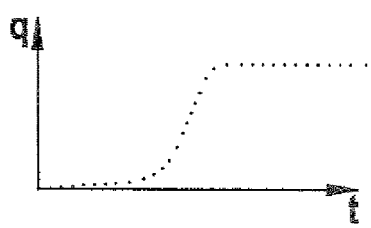

As can be seen from FIGS. 4a, 5a and 6a, the first flow openings 32 can have various shapes for attaining a desired volumetric flow over time. The associated graphs shown in FIGS. 4b, 5b and 6b each show the volumetric flows over time corresponding to the various shapes of the flow openings 32. FIG. 4b shows the volumetric flow over time for a round shape 32.1 of the first flow openings 32 as in FIG. 4a. FIG. 5b shows the volumetric flow over time for a quadrilateral shape 32.2 of the first flow openings 32 as in FIG. 5a. FIG. 6b shows the volumetric flow over time for a triangular shape 32.3 of the first flow openings 32 as in FIG. 6a.

Figure 1:
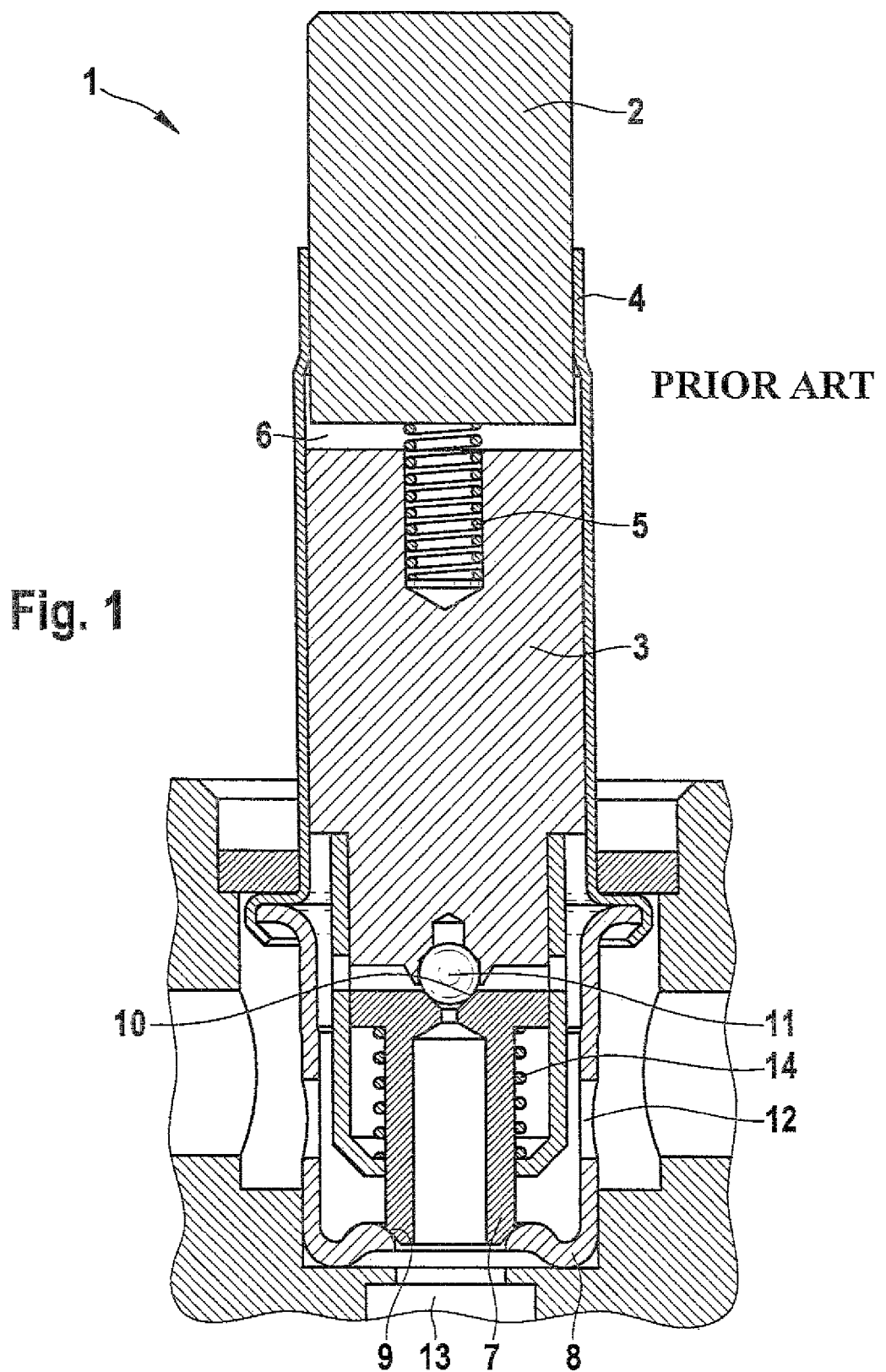
FIG. 1 shows a schematic sectional view of a valve cartridge for a conventional solenoid valve.
Figure 3:
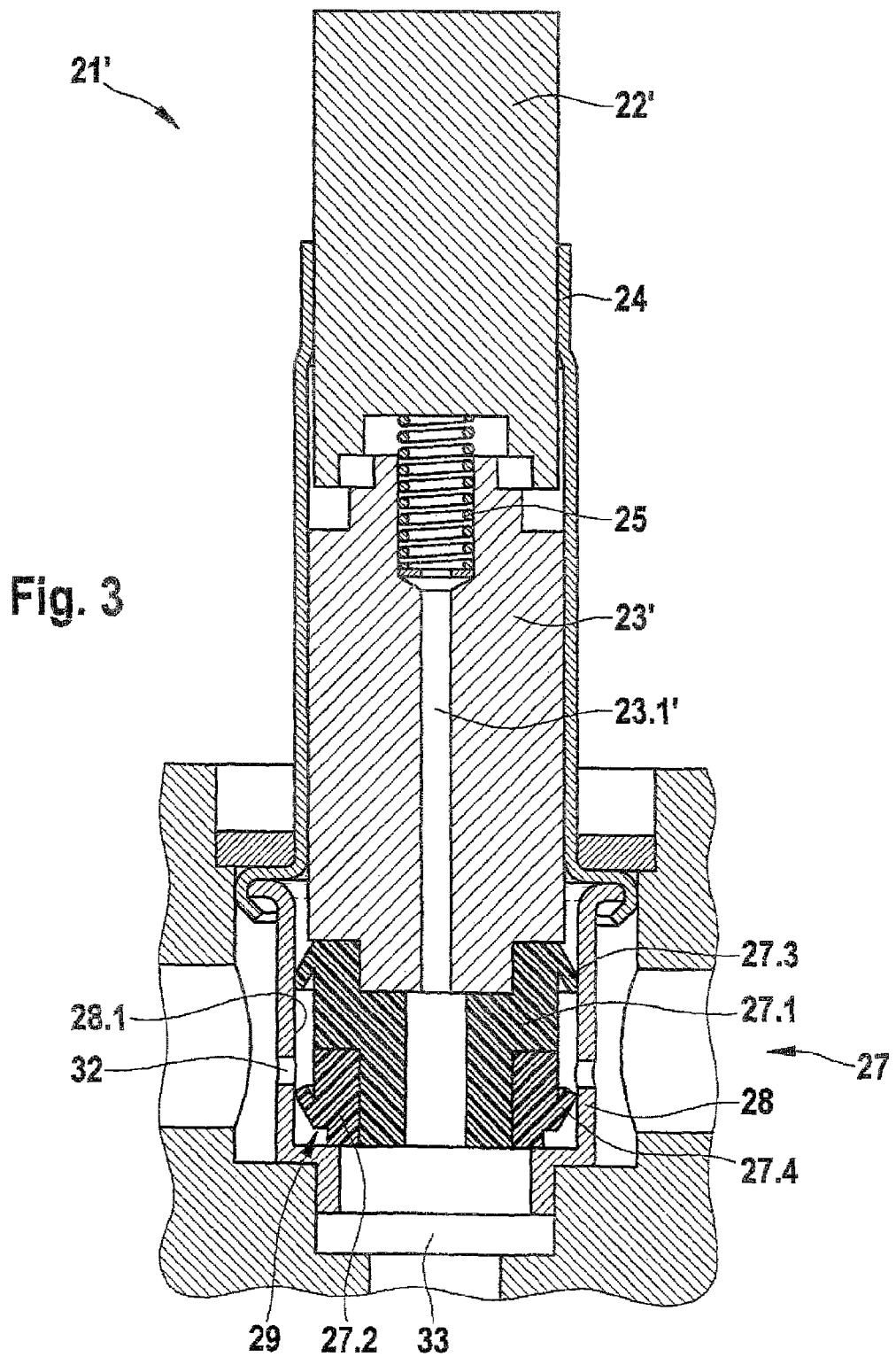
FIG. 3 shows a schematic sectional view of a second exemplary embodiment of a valve cartridge for a solenoid valve according to the invention.

As can be seen from FIG. 3, a second exemplary embodiment of a valve cartridge 21' for a solenoid valve of the invention, analogously to the first exemplary embodiment, has a pole core 22', a valve insert 24 connected to the pole core 22', an armature 23', which is guided axially movably inside the valve insert 24 and is connected to a primary closing element 27, and a valve body 28, which is connected to the valve insert 24 and which with the primary closing element 27 forms a primary valve 29 disposed between a plurality of first flow openings 32 and a second flow opening 33. In a distinction from the first exemplary embodiment in FIG. 1, in the second exemplary embodiment the armature, pressure-equalized via a compensation bore 23.1', is embodied as a solenoid plunger 23', which with a correspondingly embodied pole core 22' forms a plunger stage. By means of the embodiment as a plunger stage, the magnetic behavior of the solenoid plunger 23' and of the pole core 22' can be better varied by means of an applied control current. By way of the applied control current and the resultant linear axial motion of the solenoid plunger 23', the gradient of the volumetric flow over time between the first flow openings 32 and the second flow opening 33 can also be varied. Since the components and elements which have the same reference numerals in FIGS. 2 and 3 perform the same or analogous functions, a repetitious description of these components and elements is dispensed with here.

By means of the linear motion of the slide element and by the design of the first flow openings, the described embodiments of the invention advantageously reduce or avoid hydraulically induced switching noises that are induced in a conventional solenoid valve by the sudden opening of the valve at a slight or absent pilot pressure.

The foregoing relates to the preferred exemplary embodiments of the invention, it being understood that other variants and embodiments thereof are possible within the spirit and scope of the invention, the latter being defined by the appended claims.

The invention claimed is:

1. A solenoid valve having a valve cartridge, which cartridge includes
a pole core, a valve insert connected to the pole core, an armature, which is guided axially movably inside the valve insert and is coupled with a primary closing element, and a valve body connected to the valve insert,
which valve body, with the primary closing element, forms a primary valve disposed between at least one first flow opening and a second flow opening, and via an axial motion of the armature and of the primary closing element, the primary valve is opened counter to the force of a restoring spring and closed by the force of the restoring spring,
the primary closing element being embodied as a slide element which is guided axially movably inside an inner bore of the valve body,
the slide element and the armature being connected to one another and embodied as pressure-equalized by a compensation bore, and
the slide element being movable into an opening position by means of a linear axial opening motion of the armature and being movable into a closing position by means of a linear motion by the restoring spring via the armature,
wherein the slide element is embodied as a plastic part having a first sealing lip and a second sealing lip which seal off the primary valve from the inner bore of the valve body, and
wherein the first sealing lip and the second sealing lip are disposed such that via a pilot pressure, applied to the at least one first flow opening, effect an automatic sealing between the first sealing lip and the second sealing lip, and the inner bore of the valve body.

2. The solenoid valve as defined by claim 1, wherein the at least one sealing lip is integrally injection-molded onto the plastic slide element and/or is calibratable upon assembly with the slide element.

3. The solenoid valve as defined by claim 2, wherein the valve insert and the valve body are each embodied as a sleeve, and the valve insert sleeve and the valve body sleeve can be embodied in one piece or in two pieces.

4. The solenoid valve as defined by claim 2, wherein the slide element is embodied in two pieces, and an upper slide element has the first sealing lip and a lower slide element has the second sealing lip.

5. The solenoid valve as defined by claim 4, wherein the upper slide element is connected positively and/or nonpositively to the lower slide element.

6. The solenoid valve as defined by claim 4, wherein the valve insert and the valve body are each embodied as a sleeve, and the valve insert sleeve and the valve body sleeve can be embodied in one piece or in two pieces.

7. The solenoid valve as defined by claim 1, wherein the slide element is embodied in two pieces, and an upper slide element has the first sealing lip and a lower slide element has the second sealing lip.

8. The solenoid valve as defined by claim 7, wherein the upper slide element is connected positively and/or nonpositively to the lower slide element.

9. The solenoid valve as defined by claim 8, wherein the valve insert and the valve body are each embodied as a sleeve, and the valve insert sleeve and the valve body sleeve can be embodied in one piece or in two pieces.

10. The solenoid valve as defined by claim 9, wherein the at least one first flow opening is embodied having a shape which reduces noise of a volumetric flow over time between the at least one first flow opening and the second flow opening.

11. The solenoid valve as defined by claim 10, wherein the at least one first flow opening is embodied having a shape which provides that between the at least one flow opening and the second flow opening, a progressive volumetric flow over time results during an opening phase of the primary valve, and a degressive volumetric flow over time results during a transition to a full opening of the primary valve.

12. The solenoid valve as defined by claim 10, wherein the at least one first flow opening is embodied having a shape which provides that a gradient of the volumetric flow over time between the at least one first flow opening and the second flow opening does not exceed a predetermined threshold value.

13. The solenoid valve as defined by claim 12, wherein the pressure-equalized armature is embodied as a flat armature or as a solenoid plunger, and the flat armature cooperates with a pole core that has a flat pole face, and the solenoid plunger, with a correspondingly embodied pole core, forms a plunger stage.

14. The solenoid valve as defined by claim 1, wherein the at least one first flow opening is embodied having a shape which reduces noise of a volumetric flow over time between the at least one first flow opening and the second flow opening.

15. The solenoid valve as defined by claim 14, wherein the at least one first flow opening is embodied having a shape which provides that a gradient of the volumetric flow over time between the at least one first flow opening and the second flow opening does not exceed a predetermined threshold value.

16. The solenoid valve as defined by claim 14, wherein the at least one first flow opening is embodied having a shape which provides that between the at least one flow opening and the second flow opening, a progressive volumetric flow over time results during an opening phase of the primary valve, and a degressive volumetric flow over time results during a transition to a full opening of the primary valve.

17. The solenoid valve as defined by claim 16, wherein the at least one first flow opening is embodied having a shape which provides that a gradient of the volumetric flow over time between the at least one first flow opening and the second flow opening does not exceed a predetermined threshold value.

18. The solenoid valve as defined by claim 1, wherein the valve insert and the valve body are each embodied as a sleeve, and the valve insert sleeve and the valve body sleeve can be embodied in one piece or in two pieces.

19. The solenoid valve as defined by claim 1, wherein the pressure-equalized armature is embodied as a flat armature or as a solenoid plunger, and the flat armature cooperates with a pole core that has a flat pole face, and the solenoid plunger, with a correspondingly embodied pole core, forms a plunger stage.

* * * * *

UNITED STATES PATENT AND TRADEMARK OFFICE
CERTIFICATE OF CORRECTION

| | | |
|---|---|---|
| PATENT NO. | : 8,348,230 B2 | Page 1 of 1 |
| APPLICATION NO. | : 12/672071 | |
| DATED | : January 8, 2013 | |
| INVENTOR(S) | : Michl | |

It is certified that error appears in the above-identified patent and that said Letters Patent is hereby corrected as shown below:

On the Title Page, Item [57]

Abstract "the at mature by" should read -- the armature by --

Signed and Sealed this
First Day of October, 2013

Teresa Stanek Rea
*Deputy Director of the United States Patent and Trademark Office*